(12) United States Patent
Tai et al.

(10) Patent No.: US 7,420,515 B2
(45) Date of Patent: Sep. 2, 2008

(54) FOLDABLE AND PORTABLE COMMUNICATION APPARATUS THAT CAN REDUCE THE EM ABSORPTION

(75) Inventors: Chin-Chuan Tai, Taoyuan (TW); Chih-Min Chang, Taoyuan (TW)

(73) Assignee: QISDA Corporation, Gueishan, Taoyuan (TW)

( * ) Notice: Subject to any disclaimer, the term of this patent is extended or adjusted under 35 U.S.C. 154(b) by 15 days.

(21) Appl. No.: 11/220,087

(22) Filed: Sep. 6, 2005

(65) Prior Publication Data
US 2006/0049997 A1    Mar. 9, 2006

(30) Foreign Application Priority Data
Sep. 7, 2004    (TW) .............................. 93126985 A (51) Int. Cl.
*H01Q 1/24*    (2006.01)
(52) U.S. Cl. ..................................... 343/702; 455/575.1
(58) Field of Classification Search ................. 343/702, 343/841; 455/90.3, 575.1
See application file for complete search history.

(56) References Cited

U.S. PATENT DOCUMENTS

| 5,513,383 | A | * | 4/1996 | Tsao | 455/575.7 |
| 6,006,117 | A | * | 12/1999 | Hageltorn et al. | 455/575.7 |
| 2002/0025827 | A1 | * | 2/2002 | Song | 455/550 |
| 2003/0160726 | A1 | * | 8/2003 | Grant et al. | 343/702 |
| 2003/0190896 | A1 | * | 10/2003 | Ota et al. | 455/90.3 |
| 2004/0073687 | A1 | * | 4/2004 | Murata | 709/229 |
| 2004/0189537 | A1 | * | 9/2004 | Kinuzawa et al. | 343/702 |
| 2004/0198417 | A1 | * | 10/2004 | Yoda | 455/550.1 |

FOREIGN PATENT DOCUMENTS

| CN | 1323150 | 11/2001 |
| JP | 2003087375 A | 3/2003 |
| WO | WO 9923800 A1 * | 5/1999 |

* cited by examiner

*Primary Examiner*—Tho G Phan
(74) *Attorney, Agent, or Firm*—Hoffman Warnick, LLC (57) ABSTRACT

This invention provides a foldable and portable communication apparatus including a lower case, an upper case, and a connector. The connector is used to connect the lower case and the upper case in a foldable way. The lower case has a lower inner face. The upper case has an upper inner face and an upper outer face. The upper inner face is installed with a speaker to output an audio signal. The upper outer face is installed with an antenna. The antenna and the upper outer face form a predetermined tilt angle, and the predetermined tilt angle is less than 180 degree to reduce electromagnetic absorption by the user.

16 Claims, 7 Drawing Sheets

| Tilt Angle | Max. SAR value, mW/g | Max. EIRP, dBm | Lateral View |
|---|---|---|---|
| 180 | 2.9 | 29.09 |  C1 |
| 150 | 2.7 | N/A |  C2 |
| 135 | 2.5 | N/A |  C3 |
| 110 | 2.2 | 29.16 |  C4 |

FOLDABLE AND PORTABLE COMMUNICATION APPARATUS THAT CAN REDUCE THE EM ABSORPTION

BACKGROUND OF THE INVENTION

1. Field of the Invention

This present invention relates to a portable communication apparatus, and more particularly, to a foldable and portable communication apparatus which can reduce the electromagnetic wave absorbed by users.

2. Description of the Prior Art

Mobile phones nowadays are very popular portable communication apparatuses. The American Federal Communications Commission (FCC) sets up standard criteria, the so called specific absorption rate (SAR), for the mobile phone or its apparatus. Other countries also set up similar standard criteria. SAR indicates the ratio of unit biomass to electromagnetic wave absorption. Under these standard criteria, in the prior art, the maximum SAR level of the ratio of head average unit mass to electromagnetic wave absorption cannot exceed a predetermined value while mobile phone cases radiate the maximum outputting power at normal usage position regarding to a mobile phone close to the head. SAR can be actually measured in a lab or computed by electromagnetic numerical analysis software.

For foldable mobile phones, the method to reduce SAR of the prior art can be generally separated into two kinds: changing the circuit impedance or changing the radiating power of the antenna. However, changing the circuit impedance involves complicated circuit design, and changing the radiating power of the antenna may affect communication quality. Both ways of changing the foldable mobile phone of the prior art to reduce SAR involves complicated design modification.

The efficiency of the radiating power of the antenna can be measured by effective isotropic radiated power (EIRP). In principle, when the communication distance is fixed, the bigger of the value of EIRP, the stronger the receiving signal, and the better the communication quality. In contrast, the same EIRP can exchange for farther communication distance or bigger covering range in the condition of the same communication quality and the same strength of receiving signal. When designing mobile phones, the EIRP must also be taken into consideration in addition to the fact that SAR should be reduced. In other words, the communication quality should be maintained while reducing the electromagnetic wave absorbed by users.

A foldable mobile radio equipment was disclosed in Japan patent No.2003-087375, which includes an upper case and a lower case. An antenna is disposed in the lower case and connected with the upper case by complicated machinery design. The major objective of the Japan patent is to avoid a situation in which radio wave reception sensitivity is reduced by antenna interference.

It is very important to reduce SAR and also take EIRP into consideration while designing the portable communication apparatus.

SUMMARY OF THE INVENTION

The major objective of the present invention is to provide a kind of foldable and portable communication apparatus to reduce the electromagnetic wave absorbed by users.

The foldable and portable communication apparatus of the present invention includes a lower case, an upper case, and a connector. The connector is used for connecting the lower case and the upper case in a foldable manner. The lower case includes a lower inner face. The upper case includes an upper inner face and an upper outer face. The upper inner face is installed with a speaker to output a first audio signal. The upper outer face is installed with an antenna. The antenna and the upper outer face define a predetermined tilt angle, and the predetermined tilt angle is less than 180 degree.

In the foldable and portable communication apparatus of the present invention, the antenna is installed in the upper case, and the predetermined tilt defined by the antenna and the upper outer case is less than 180 degree; this design keeps the radiation of the electromagnetic wave field, radiated by the antenna, away from a user who uses the communication apparatus, so as to reduce the electromagnetic energy absorbed by the user. Applying the present invention can reduce SAR of the foldable and portable communication apparatus and can also maintain EIRP at the same time, without complicated machinery or circuit design.

The advantage and spirit of the invention may be understood by the following recitations together with the appended drawings.

DETAILED DESCRIPTION OF THE INVENTION

Figure 1:
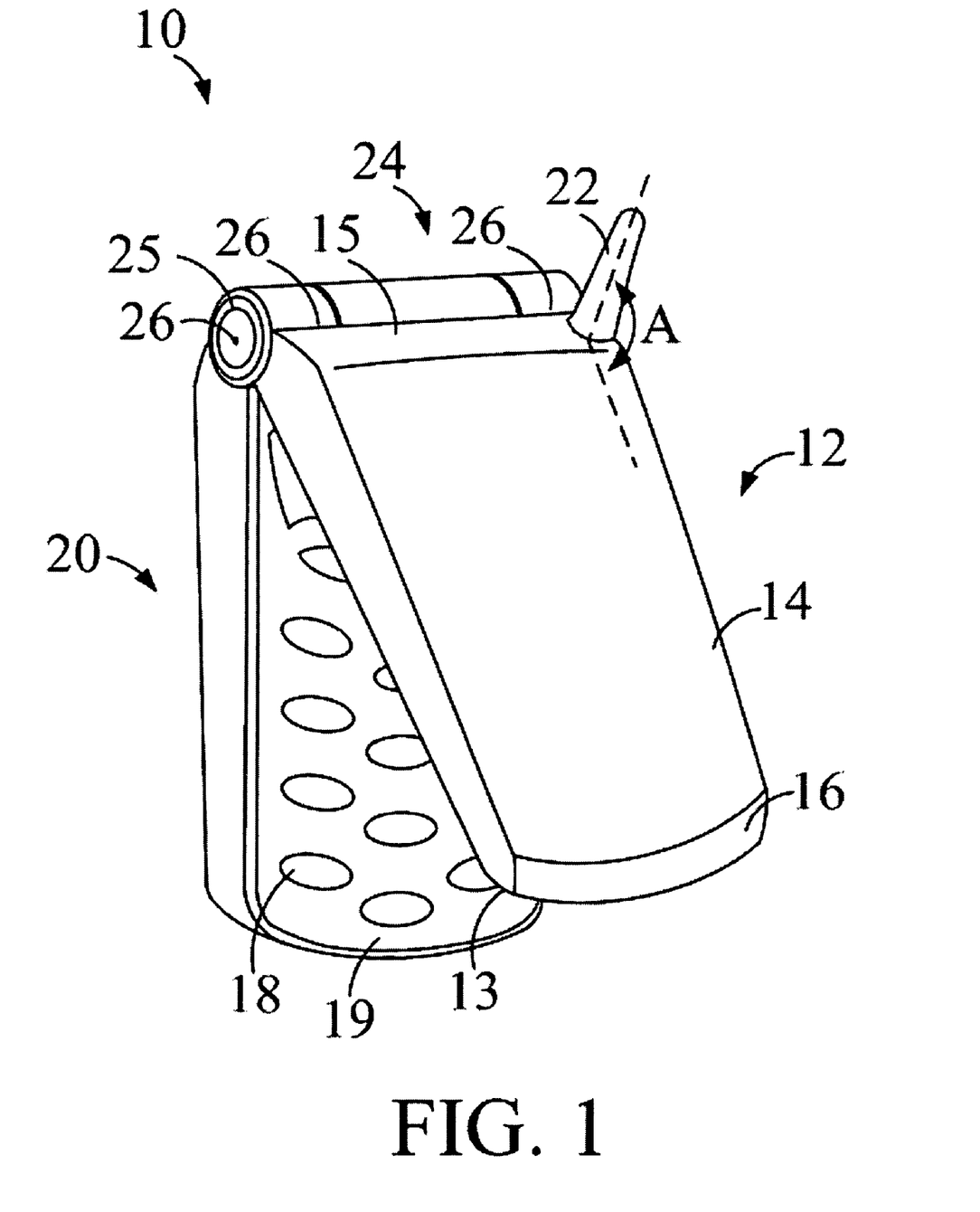
FIG. 1 is an external view diagram of the foldable and portable communication apparatus of the present invention.
Figure 2:
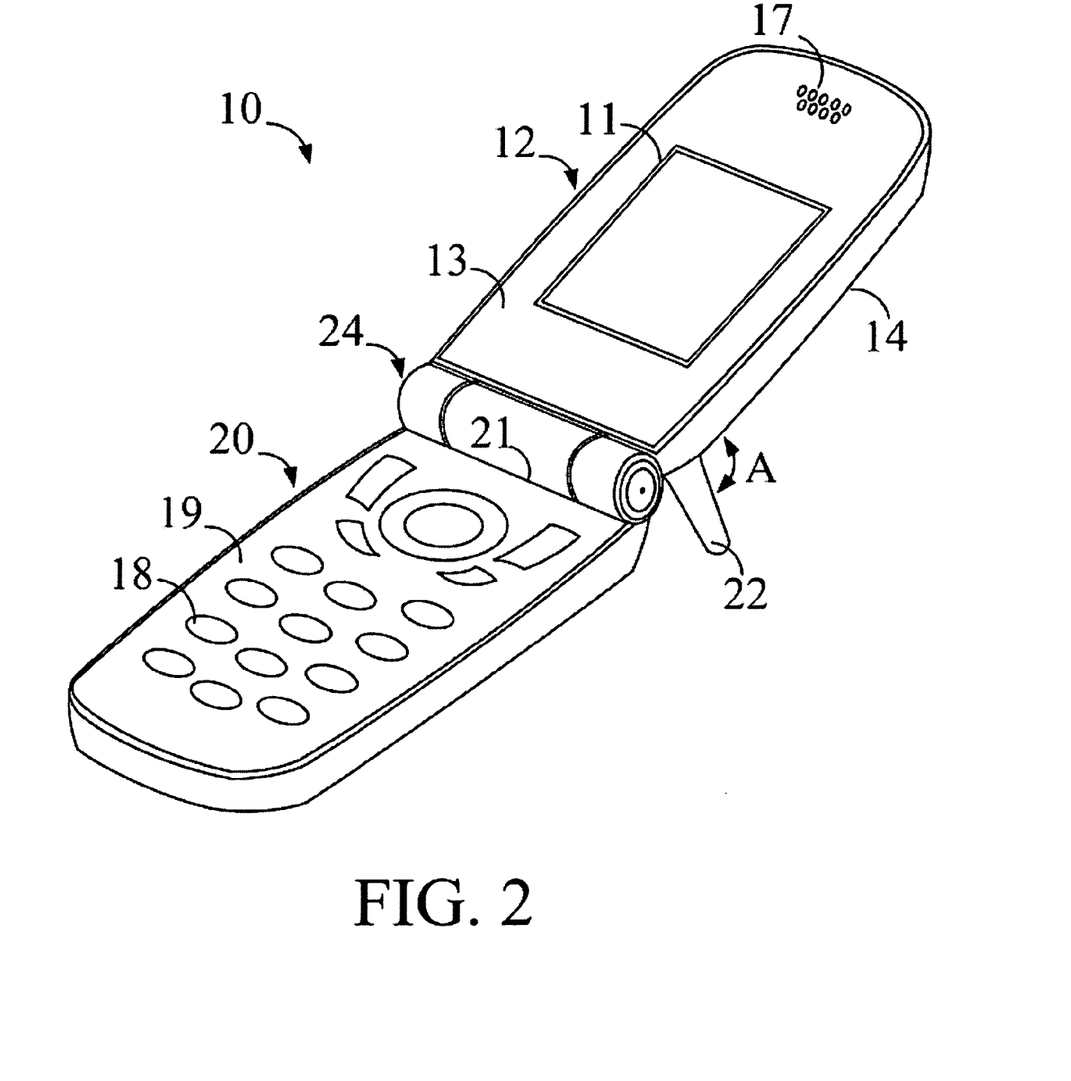
FIG. 2 is a lateral view of FIG. 1 wherein the portable communication apparatus is in an unfolded state.

Referring to FIG. 1 and FIG. 2, FIG. 1 is an outer-view diagram of the foldable and portable communication apparatus 10 of the present invention, and FIG. 2 is a lateral view of FIG. 1 wherein the portable communication apparatus 10 is in an unfolded state. In an embodiment of the present invention, a foldable and portable communication apparatus 10 includes an upper case 12, a lower case 20, and a connector 24. The connector 24 is used for connecting the upper case 12 and the lower case 20 in a foldable manner.

The lower case 20 includes a lower inner face 19. The lower inner face 19 is installed with a plurality of input buttons 18 to provide the user a medium for inputting an alphabet, a character, or a number. The upper case 12 includes an upper inner face 13 and an upper outer face 14. The upper inner case face 13 is installed with a display panel 11 to display an alphabet, a character, a number, a graphic, or an image.

The upper case 12 also includes a first side 15 and a second side 16, wherein the first side 15 is closer to the connector 24, and the second side 16 is further away from the connector 24. The upper outer face 14 is installed with an antenna 22 in the vicinity of the first side 15.

When the portable communication apparatus 10 is in a non-communicating state, or standby mode, the upper case 12 and the lower case 20 are kept in the folded manner by the connector 24, so that the upper inner face 13 and the lower inner face 19 contacts each other due to the folding. When the portable communication apparatus 10 is in a communication state, the upper case 12 and the lower case 20 are kept in the unfolded manner by the connector 24.

In the embodiment illustrated in FIG. 1 and FIG. 2, the connector 24 includes a shaft member 25, recess portions 21 formed in the lower case 20, and two holes formed in the lower case 20. The shaft member 25 includes an axle 26 and two contact portions which are disposed in the two holes of the lower case. The upper case 12 rotates through the axle 26 of the shaft member 25 which enables the upper case 12 and the lower case 20 to be kept in a folded or unfolded manner. In another embodiment, the connector 24 includes two shaft members 25, wherein one contact portion of each shaft member 25 is disposed in the corresponding hole of the lower case 20, and the axle 26 of the two shaft members 25 correspond with each other to allow the upper case 12 to rotate through the axle 26 of the two shaft members 25.

The upper inner face 14 is installed with a speaker 17 for outputting a first audio signal. The lower inner face 19 is installed with a microphone (not shown) for receiving a second audio signal. When the communication apparatus 10 is in a communicating state, the upper case 12 and the lower case 20 are kept in an unfolded manner by the connector 24, so that the user hears the first audio signal by approaching the speaker 17 of the upper inner face 13. Furthermore, when the communication apparatus 10 is in a communicating state, the user can also send out the second audio signal by approaching the microphone of the lower inner face 19, and the second audio signal is received by the microphone.

The antenna 22 is a dipole antenna in a column shape, and at least a section of the antenna protrudes from the upper outer face 14. The antenna 22 and the upper outer face 14 define a predetermined tilt angle A which is less than 180 degree. Because the antenna 22 is installed on the upper case 14, the antenna 22 moves with the upper case 12, wherein this kind of moving mechanism does not require complicated machinery design while the upper case 12 and the lower case 20 are kept in an unfolded manner.

In the portable communication apparatus 10, the predetermined tilt angle A corresponds to an electromagnetic wave field that the antenna 22 radiates. The electromagnetic wave field changes accordingly when the predetermined tilt angle A is changed. Changing the predetermined tilt angle A of the antenna 22 keeps the radiation of the electromagnetic wave field radiated by the antenna 22 away from the user who uses the communication apparatus 10, so as to reduce the electromagnetic energy absorbed by the user.

Comparing with the foldable and portable communication apparatus of the prior art, the portable communication apparatus 10 of the present invention is very different. In the foldable and portable communication apparatus of the prior art, the antenna protrudes in a direction parallel with the lower case, and the antenna correspondingly parallels with the user's head while the user listens with their ears close to the portable communication apparatus of the prior art. In the portable communication apparatus 10 of present invention, as the antenna 22 is disposed on the first side 15 of the upper case 14 in a predetermined tilt angle A of less than 180 degree, the antenna 22 is correspondingly away from the user's head while the user unfolds the portable communication apparatus and listens with his/her ear close to the upper inner face 13, as illustrated in FIG. 2. Therefore, the electromagnetic wave field radiated by the antenna 22 of the portable communication apparatus 10 of the present invention is kept away from the user who uses the portable communication apparatus 10, so as to reduce the electromagnetic wave energy absorbed by the user. The invention does not require complicated machinery and circuit design to be put into practical application.

In different embodiments, besides taking the predetermined tilt angle A, defined by the antenna 22 and the upper outer face 14, into consideration, the connector 24 can be different structures. The design of the connector 24 mainly takes the following aspects into consideration: the upper case 12 should be able to rotate through the axle 26 of the shaft member 25 in order to keep the upper case 12 and the lower case 20 in a folded or unfolded manner, and the antenna 22 disposed on the upper case 12 should not collide with the lower case 20 while the portable communication apparatus 10 is in the unfolded manner, so that the user can hold and use the portable communication apparatus 10 by hand comfortably. In different embodiments, the antenna 22 is correspondingly away from the user's head while the user unfolds the portable communication apparatus, and the electromagnetic wave field radiated by the antenna 22 of the portable communication apparatus 10 of the present invention is kept away from the user who uses the portable communication apparatus 10, so as to reduce the electromagnetic wave energy absorbed by the user.

Figure 3:
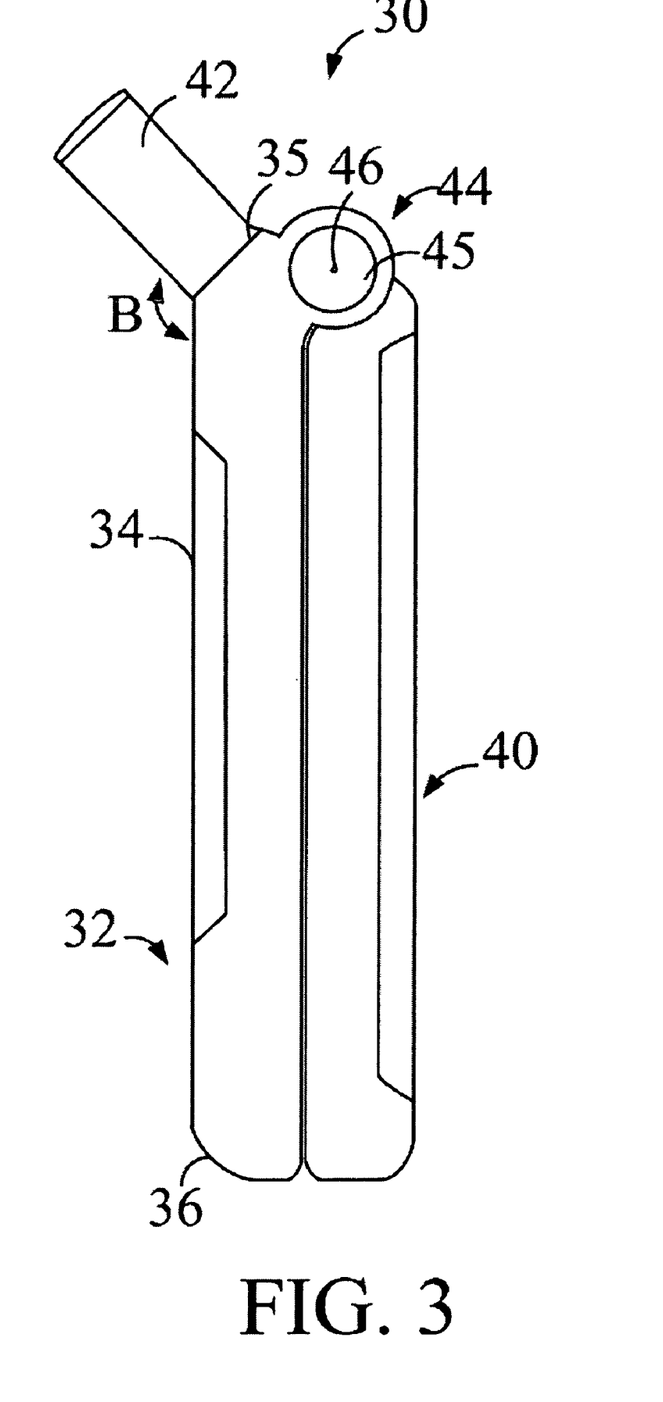
FIG. 3 is a lateral view of another embodiment of the present invention wherein the foldable and portable communication apparatus is in a folded state.
Figure 4:
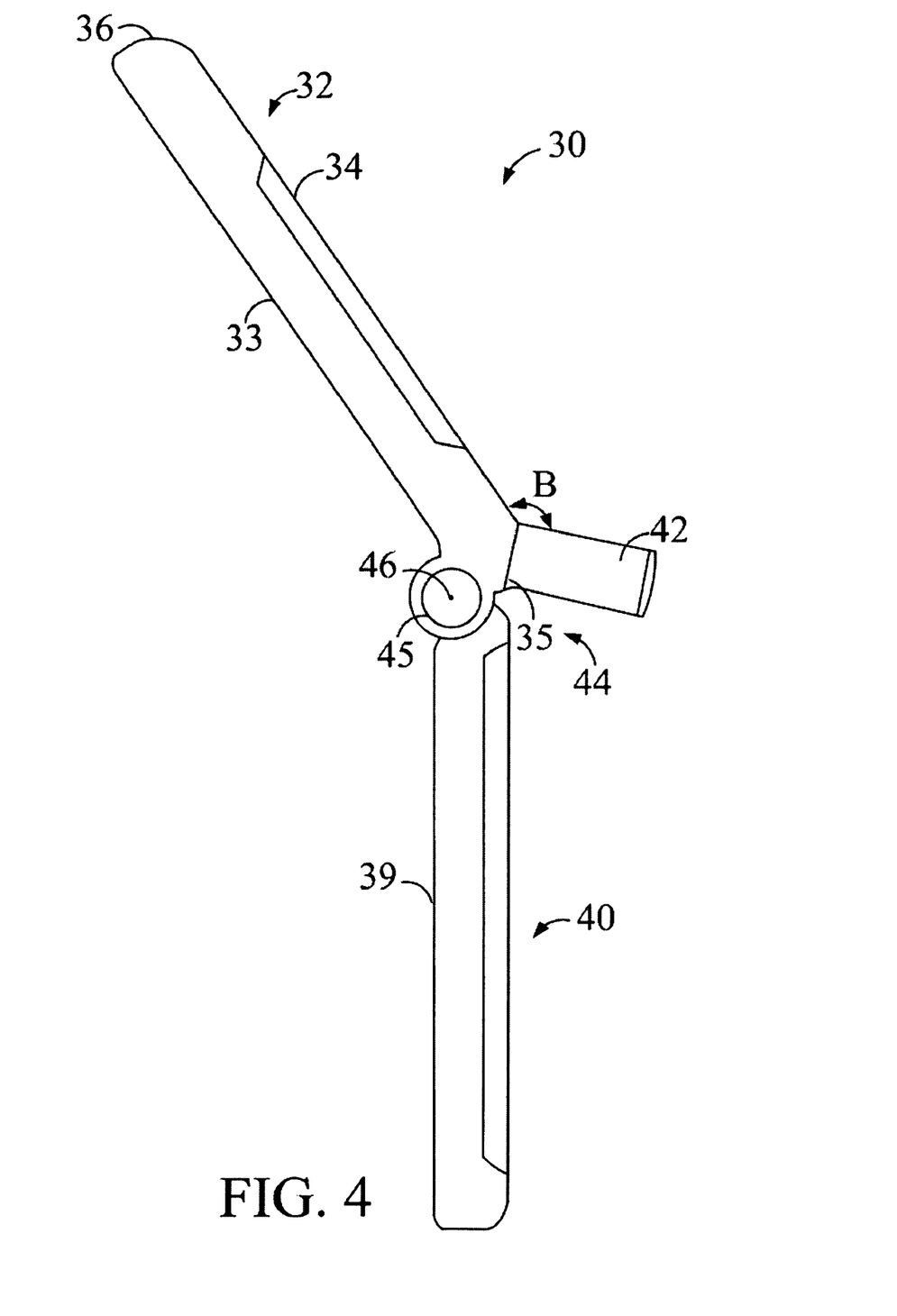
FIG. 4 is a lateral view of FIG. 3 wherein the portable communication apparatus is in an unfolded state.

Besides, in different embodiments, the antenna 22 of the portable communication apparatus 10 can be installed in the vicinity of the second side 16 of the upper outer face 13, and the predetermined tilt angle defined by the antenna 22 and the upper case is less than 180 degree. Please refer to FIG. 3 and FIG. 4; FIG. 3 is a lateral view of another embodiment of the present invention wherein the foldable and portable communication apparatus 30 is in a folded state, and FIG. 4 is a lateral view of FIG. 3 wherein the portable communication apparatus 30 is in an unfolded state. According to another embodiment of the present invention, the portable communication apparatus 30 includes an upper case 32, a lower case 40, and a connector 44. The main difference between the portable communication apparatus 10 and the portable communication apparatus 30 is the structure of the connector. In the portable communication apparatus 30, the connector 44 includes a shaft member 45. The lower case 40 includes two recess portions, and the structure of the side 35 of the upper case 32 corresponds to the two recess portions of the lower case 40, so as to allow the upper case 32 to rotate through the axle 46 of the shaft member 45 and to keep the upper case 32 and the lower case 40 in the folded or unfolded manner.

In the portable communication apparatus 30, as illustrated in FIG. 3 and FIG. 4, the antenna 42 is disposed on the first side 35 of the upper case 32, and the predetermined tilt angle B defined by the antenna 42 and the upper outer face 34 is less than 180 degree. In different embodiments, the tilt angle B can be different angle less than 180 degree. The electromagnetic wave field radiated by the antenna 42 changes accordingly when the predetermined tilt angle B is changed. Besides the tilt angle B, the design of the corresponding structures of the connector 44 and the upper case 32 and the lower case 40 can have different manners that are well-known to machinery designers of general foldable communication apparatuses, so it will not be described in detail again.

In the portable communication apparatus 30, the upper inner face 33 is installed with a speaker, and the lower inner face 39 is installed with a microphone. The antenna 42 is correspondingly away from the user's head while the user unfolds the portable communication apparatus 30 to listen, and the electromagnetic wave field radiated by the antenna 42 is kept away from the user who uses the portable communication apparatus 30, so as to reduce the electromagnetic wave energy absorbed by the user.

Besides, in different embodiments, the antenna 42 of the portable communication apparatus 30 can also be installed in the vicinity of the second side 36 of the upper outer face 34, and the predetermined tilt angle defined by the antenna 42 and the upper outer case 34 is less then 180 degree.

Figure 5:
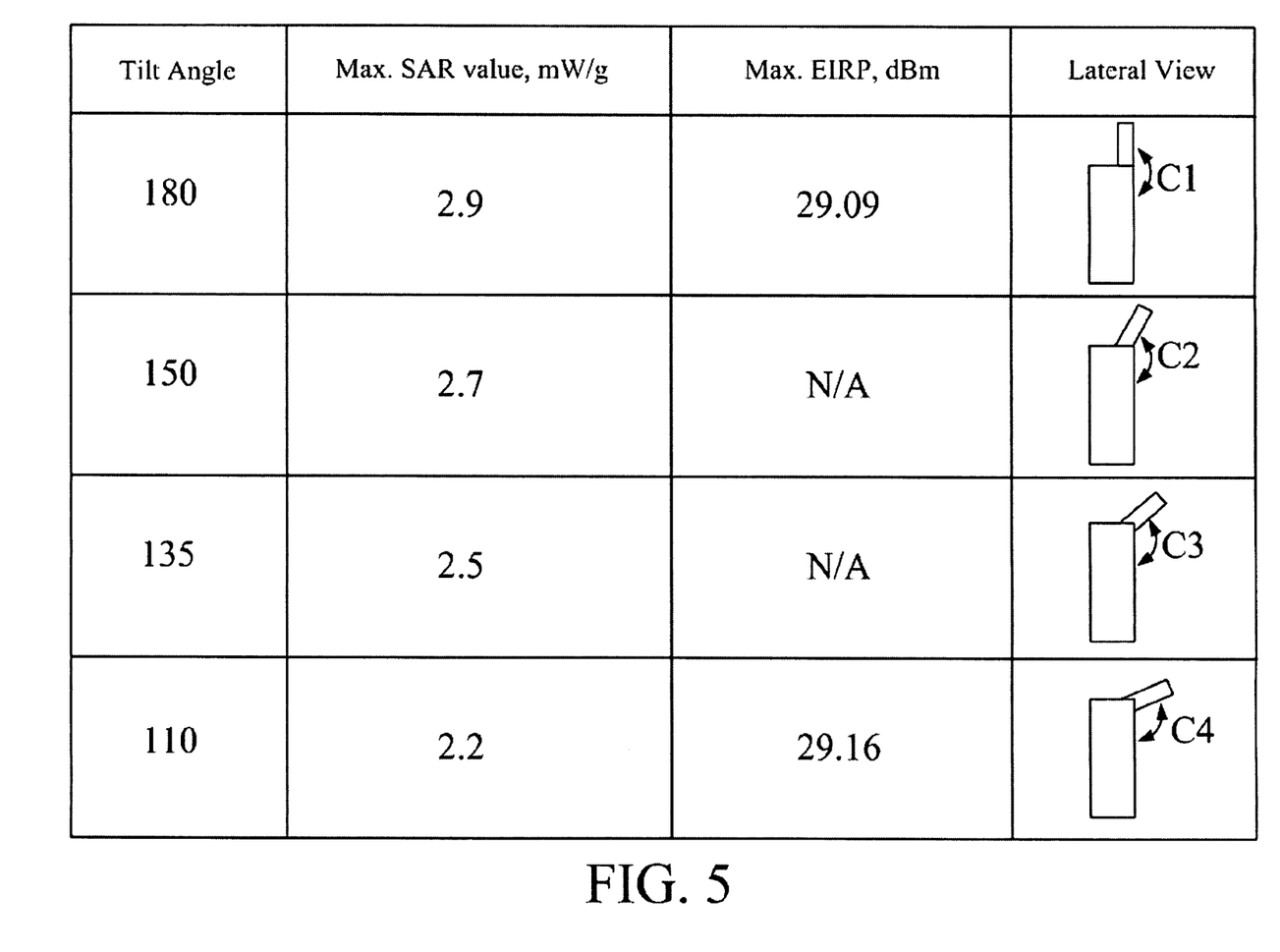
FIG. 5 is a table of test results showing SAR, EIRP, and the tilt angle of the antenna of the portable communication apparatus.
Figure 6:
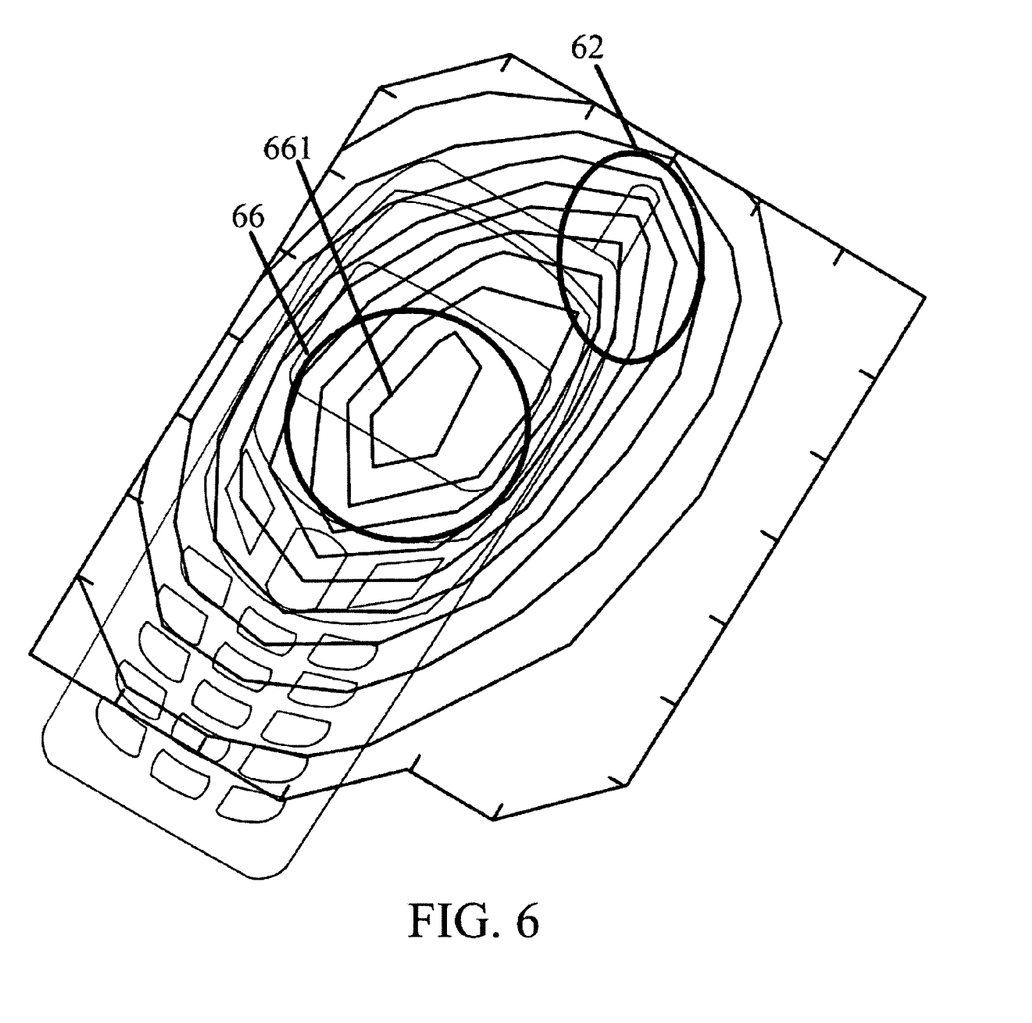
FIG. 6 is a schematic diagram of the electromagnetic wave energy distribution corresponding to the tilt angle of the antenna installed in the test of FIG. 5 which is 180 degree.
Figure 7:
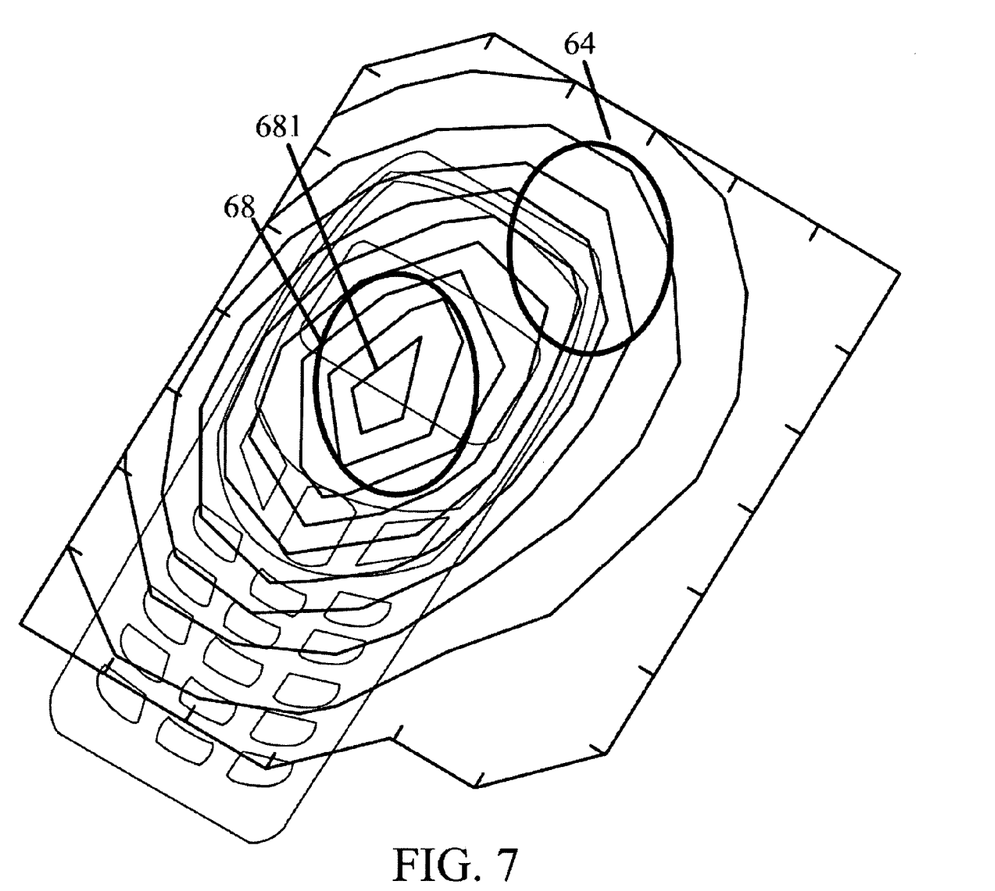
FIG. 7 is a schematic diagram of the electromagnetic wave energy distribution corresponding to the tilt angle of the antenna installed in the test of FIG. 5 which is 110 degree.

Please refer to FIG. 5, FIG. 6, and FIG. 7; FIG. 5 is a table of test results showing SAR, EIRP, and the tilt angle of the antenna of the portable communication apparatus; FIG. 6 is a schematic diagram of the electromagnetic wave energy distribution corresponding to the tilt angle of the antenna installed in the test of FIG. 5 which is 180 degree, and FIG. 7 is a schematic diagram of the electromagnetic wave energy distribution corresponding to the tilt angle of the antenna installed in the test of FIG. 5 which is 110 degree. In one of the test experiments, the changes of the maximum SAR value and the maximum ERIP value of the portable communication apparatus at different tilt angles will be tested in a condition with the same communication mode (CDMA), channel (384), and conducted power (25 dBM). In FIG. 5, the tilt angles C1, C2, C3, and C4 defined by the tester, the antenna, and the portable communication apparatus respectively are 180, 150, 135, and 110 degree. FIG. 6 and FIG. 7 are respectively the equivalence energy curve corresponding to the electromagnetic wave in which the tilt angles are 180 degree and 110 degree, as defined by the antenna and the portable communication apparatus in FIG. 5. In FIG. 7, the antenna is inclined to the back side of the portable communication apparatus, so the diagram fails to display the tilt angle of the antenna.

When the tilt angle decreases gradually from 180 degree, SAR also gradually decreases according to the test results of FIG. 5. In other words, the smaller the tilt angle of the antenna, the smaller the maximum SAR value measured. The coil circle 66 of FIG. 6 and the coil circle 68 of FIG. 7 respectively represent the covered region of higher SAR while the tilt angles are respectively 180 degree (C1) and 110 degree (C4). The region 681 of the high SAR, while the tilt angle is 110 degree, is smaller than the region 661 of the high SAR while the tilt angle is 180 degree. Comparing the respective area marked by the coil circle 62 of FIG. 6 with that of the coil circle 64 of FIG. 7, the electric field energy in the vicinity of the antenna while the tilt angle is 110 degree (FIG. 7) is weaker than while the tilt angle is 180 degree (FIG. 6). However, comparing the ERIP while the tilt angles are respectively 180 and 110 degree shows little difference. Results of the above indicate that if the tilt angle of the antenna is closer to C4, SAR is smaller, but EIPR thereof will not reduce.

In the foldable and portable communication apparatus of the present invention, the antenna is installed in the upper case, and the tilt angle defined by the antenna and the upper outer face is less than 180 degree. When the user unfolds the portable communication apparatus to listen, the antenna is correspondingly away from the user's head to keep the electromagnetic wave field radiated by the antenna away from the user who uses the communication apparatus, so as to reduce the electromagnetic energy absorbed by the user and to keep the efficiency of radiation of the antenna at the same time. The invention can be applied in practice for the foldable and portable communication apparatus without requiring complicated machinery or circuit modification.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A communication apparatus, comprising:
   an upper case comprising an upper inner face and an upper outer face, the upper inner face being installed with a speaker to output a first audio signal, the upper outer face being installed with an antenna, the antenna and the upper outer face defining a predetermined tilt angle;
   a lower case comprising a lower inner face; and
   a connector for connecting the lower case and the upper case in a foldable manner;
   wherein the predetermined tilt angle is less than 180 degree; the upper outer face comprises a first side and a second side; the first side is closer to the connector, and the second side is away from the connector; the antenna is installed in the vicinity of the first side of the upper outer face.

2. The communication apparatus of claim 1, wherein the antenna is a dipole antenna in a column shape, and at least a section of the antenna protrude the upper outer face.

3. The communication apparatus of claim 1, wherein the predetermined tilt angle corresponds to an electromagnetic wave field that the antenna radiates, and the electromagnetic wave field changes accordingly when the predetermined tilt angle is changed.

4. The communication apparatus of claim 3, wherein changing the predetermined tilt angle of the antenna enables it to keep the radiation of the electromagnetic wave field radiated from the antenna away from a user who uses the communication apparatus, so as to reduce the electromagnetic energy absorbed by the user.

5. The communication apparatus of claim 1, wherein the connector comprises at least a shaft member and defines at least a recess portion formed in the lower case; the shaft member comprises an axle and at least a contact portion; two contact portions of the shaft member are disposed in two holes of the lower case, and the upper case rotates through the axle of the shaft member, so as to enable the upper case and the lower case to be kept in a folded or unfolded manner.

6. The communication apparatus of claim 5, wherein the connector comprises two recess portions, and the shaft member comprises two contact portions.

7. The communication apparatus of claim 5, wherein when the communication apparatus is in a non-communicating state, the upper case and the lower case are kept in a folded manner by the connector, so that the upper inner face and the lower inner face contact each other due to the folding.

8. The communication apparatus of claim 5, wherein when the communication apparatus is in a communicating state, the upper case and the lower case are kept in an unfolded manner by the connector, so that a user hears the first audio signal by approaching the upper inner face.

9. The communication apparatus of claim 5, wherein the lower inner face is installed with a microphone for receiving a second audio signal, and wherein when the communication apparatus is in the communicating state, the user sends out the second audio signal by approaching the microphone on the lower inner face, and the second audio signal is received by the microphone.

10. The communication apparatus of claim 1, wherein the upper inner face is installed with a display panel for displaying an alphabet, a character, a number, a graphic, an image, or a combination thereof.

11. The communication apparatus of claim 1, wherein the lower inner face is installed with a plurality of input buttons for a user to input an alphabet, a character, a number, or a combination thereof.

12. A foldable communication apparatus comprising:
 a lower case; and
 an upper case having a first side and a second side opposite to the first side, the upper case being rotatably coupled with the lower case at the first side, the upper case further comprising a speaker and an antenna,
  wherein the antenna is a dipole antenna in a column shape and at least a section of the antenna protrudes the first side of the upper case and the upper case having an inner surface and an outer surface opposite to the inner surface, when the foldable communication apparatus is folded, the lower case facing the inner surface, wherein the antenna is far away from the second side, nearby the first side, and positioned at the outer surface.

13. The communication apparatus of claim 12, wherein the upper case farther comprises:
 an upper inner face, the speaker being installed on the upper inner face; and
 an upper outer face, the antenna being installed on the upper outer face, the antenna and the upper outer face defining a predetermined tilt angle, wherein the predetermined tilt angle corresponds to an electromagnetic wave field that the antenna radiates, and the electromagnetic wave field changes accordingly when the predetermined tilt angle is changed.

14. The communication apparatus of claim 13, wherein changing the predetermined tilt angle of the antenna enables it to keep the radiation of the electromagnetic wave field radiated from the antenna away from a user who uses the communication apparatus, so as to reduce the electromagnetic energy absorbed by the user.

15. The communication apparatus of claim 12, wherein the speaker is nearby the second side.

16. The communication apparatus of claim 12, further comprising:
 a connector for connecting the lower case and the first side of the upper case.

\* \* \* \* \*